(12) United States Patent
Hubinette

(10) Patent No.: US 8,572,114 B1
(45) Date of Patent: *Oct. 29, 2013

(54) DETERMINING PROXIMITY TO TOPICS OF ADVERTISEMENTS

(75) Inventor: Carl F. Hubinette, Bothell, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/332,999

(22) Filed: Dec. 21, 2011

Related U.S. Application Data

(63) Continuation of application No. 11/736,448, filed on Apr. 17, 2007, now Pat. No. 8,086,624.

(51) Int. Cl.
*G06F 17/30* (2006.01)

(52) U.S. Cl.
USPC ........... 707/769; 707/770; 707/771; 707/772; 707/773; 707/774; 707/775

(58) Field of Classification Search
USPC ......... 707/758–760, 769, 770, 771, 772, 773, 707/774, 775
See application file for complete search history.

(56) References Cited

U.S. PATENT DOCUMENTS

| | | | | |
|---|---|---|---|---|
| 5,724,521 | A * | 3/1998 | Dedrick | 705/26.1 |
| 5,740,549 | A * | 4/1998 | Reilly et al. | 705/14.42 |
| 5,778,363 | A * | 7/1998 | Light | 1/1 |
| 5,848,397 | A * | 12/1998 | Marsh et al. | 705/14.61 |
| 5,948,061 | A * | 9/1999 | Merriman et al. | 709/219 |
| 6,026,368 | A * | 2/2000 | Brown et al. | 705/14.56 |
| 6,044,376 | A * | 3/2000 | Kurtzman, II | 1/1 |
| 6,076,082 | A * | 6/2000 | Kindo | 706/12 |
| 6,078,914 | A * | 6/2000 | Redfern | 1/1 |
| 6,094,653 | A * | 7/2000 | Li et al. | 1/1 |
| 6,144,944 | A * | 11/2000 | Kurtzman et al. | 705/14.54 |
| 6,167,382 | A * | 12/2000 | Sparks et al. | 705/14.73 |
| 6,269,361 | B1 * | 7/2001 | Davis et al. | 1/1 |
| 6,401,075 | B1 * | 6/2002 | Mason et al. | 705/14.72 |
| 6,401,096 | B1 * | 6/2002 | Zellweger | 707/702 |
| 6,405,188 | B1 * | 6/2002 | Schwartz et al. | 707/706 |
| 6,745,180 | B2 * | 6/2004 | Yamanoue | 707/734 |
| 6,816,857 | B1 * | 11/2004 | Weissman et al. | 1/1 |
| 6,961,756 | B1 | 11/2005 | Dilsaver et al. | |
| 6,985,882 | B1 * | 1/2006 | Del Sesto | 705/37 |
| 7,039,599 | B2 * | 5/2006 | Merriman et al. | 705/14.52 |
| 7,136,875 | B2 * | 11/2006 | Anderson et al. | 1/1 |

(Continued)

FOREIGN PATENT DOCUMENTS

WO     WO9721183 A1    6/1997

OTHER PUBLICATIONS

AdForce, Inc., A Complete Guide to AdForce, Version 2.6, 1998.
AdForce, Inc., S-1/A SEC Filing, May 6, 1999.

(Continued)

*Primary Examiner* — Frantz Coby
(74) *Attorney, Agent, or Firm* — Fish & Richardson P.C.

(57) ABSTRACT

The present disclosure includes a system and method for determining proximity to topics of content items (e.g., an advertisement or "ad"). In some implementations, a method includes identifying search criteria associated with keywords of a content item. The keywords used in determining whether or not to embed the content item in Web pages including search results. Numerical scores for the search criteria is determined based, at least in part, on a topic of the content item, the numerical score indicative of proximity to the topic of the content item.

20 Claims, 4 Drawing Sheets

(56) References Cited

U.S. PATENT DOCUMENTS

| | | | |
|---|---|---|---|
| 7,162,468 B2* | 1/2007 | Schwartz et al. | 1/1 |
| 7,181,438 B1* | 2/2007 | Szabo | 1/1 |
| 7,268,823 B2 | 9/2007 | Mitts et al. | |
| 7,383,258 B2* | 6/2008 | Harik et al. | 1/1 |
| 7,406,465 B2* | 7/2008 | Jones et al. | 1/1 |
| 7,487,145 B1 | 2/2009 | Gibbs et al. | |
| 7,593,921 B2* | 9/2009 | Goronzy et al. | 1/1 |
| 7,739,295 B1 | 6/2010 | Agrawal et al. | |
| 7,774,333 B2* | 8/2010 | Colledge et al. | 707/708 |
| 7,801,899 B1* | 9/2010 | Spitkovsky | 707/748 |
| 7,831,472 B2* | 11/2010 | Yufik | 705/14.4 |
| 7,899,759 B1 | 3/2011 | Heggem | |
| 8,024,345 B2* | 9/2011 | Colledge et al. | 707/741 |
| 8,046,347 B2 | 10/2011 | Joshi | |
| 8,046,529 B2 | 10/2011 | Lam | |
| 8,050,983 B1 | 11/2011 | Eakin et al. | |
| 8,135,712 B1 | 3/2012 | Coladonato et al. | |
| 8,209,317 B2 | 6/2012 | Joshi | |
| 8,229,942 B1* | 7/2012 | Hubinette | 707/759 |
| 8,229,949 B2 | 7/2012 | Yamasaki et al. | |
| 8,290,949 B2 | 10/2012 | Baker et al. | |
| 2002/0059219 A1* | 5/2002 | Neveitt | 707/5 |
| 2002/0099676 A1* | 7/2002 | Kindo | 706/16 |
| 2002/0138478 A1* | 9/2002 | Schwartz et al. | 707/3 |
| 2002/0156917 A1* | 10/2002 | Nye | 709/238 |
| 2002/0174101 A1* | 11/2002 | Fernley et al. | 707/1 |
| 2004/0220900 A1 | 11/2004 | Yang et al. | |
| 2004/0236725 A1 | 11/2004 | Amitay et al. | |
| 2004/0249804 A1 | 12/2004 | Nakayama et al. | |
| 2004/0267723 A1 | 12/2004 | Bharat | |
| 2005/0086219 A1 | 4/2005 | Martin | |
| 2005/0114198 A1 | 5/2005 | Koningstein et al. | |
| 2005/0137939 A1* | 6/2005 | Calabria et al. | 705/26 |
| 2005/0144064 A1* | 6/2005 | Calabria et al. | 705/14 |
| 2005/0144065 A1* | 6/2005 | Calabria et al. | 705/14 |
| 2005/0165766 A1 | 7/2005 | Szabo | |
| 2006/0026152 A1 | 2/2006 | Zeng et al. | |
| 2006/0129534 A1 | 6/2006 | Jones et al. | |
| 2006/0161534 A1 | 7/2006 | Carson et al. | |
| 2006/0173744 A1 | 8/2006 | Kandasamy et al. | |
| 2006/0206479 A1 | 9/2006 | Mason | |
| 2006/0206516 A1 | 9/2006 | Mason | |
| 2006/0229942 A1 | 10/2006 | Miller et al. | |
| 2006/0248078 A1 | 11/2006 | Gross et al. | |
| 2007/0027750 A1 | 2/2007 | Chou | |
| 2007/0050356 A1 | 3/2007 | Amadio | |
| 2007/0067215 A1 | 3/2007 | Agarwal et al. | |
| 2007/0174118 A1 | 7/2007 | Dekel et al. | |
| 2007/0288454 A1* | 12/2007 | Bolivar et al. | 707/5 |
| 2008/0046917 A1 | 2/2008 | de Heer | |
| 2008/0052152 A1 | 2/2008 | Yufik | |
| 2008/0109285 A1* | 5/2008 | Reuther et al. | 705/7 |
| 2008/0154723 A1 | 6/2008 | Ferguson et al. | |
| 2008/0228699 A1 | 9/2008 | Kenedy et al. | |
| 2008/0256034 A1* | 10/2008 | Chang et al. | 707/3 |
| 2009/0043741 A1 | 2/2009 | Kim | |
| 2010/0036726 A1 | 2/2010 | Gallet | |
| 2010/0223125 A1* | 9/2010 | Spitkovsky | 705/14.42 |
| 2011/0040791 A1 | 2/2011 | Kenedy et al. | |
| 2011/0078168 A1 | 3/2011 | Kenedy et al. | |
| 2012/0066069 A1 | 3/2012 | Ferguson et al. | |
| 2012/0166182 A1 | 6/2012 | Ko et al. | |

OTHER PUBLICATIONS

AdKnowledge Campaign Manager: Reviewer's Guide, AdKnowledge, Aug. 1998.

AdKnowledge Market Match Planner: Reviewer's Guide, AdKnowledge, May 1998.

Ad-Star.com website archive from www.Archive.org, Apr. 12, 1997 and Feb. 1, 1997.

Baseview Products, Inc., AdManagerPro Administration Manual v. 2.0, Dec. 1998.

Baseview Products, Inc., ClassManagerPro Administration Manual v. 1.0.5, Feb. 1997.

Business Wire, "Global Network, Inc. Enters into Agreement in Principle With Major Advertising Agency," Oct. 4, 1999.

Information Access Technologies, Inc., Aaddzz brochure, "The Best Way to Buy and Sell Web Advertising Space," © 1997.

Information Access Technologies, Inc., Aaddzz.com website archive from www.Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Rexamination of U.S. Patent No. 6,446,045, Control No. 95/001,061.

Request for Rexamination of U.S. Patent No. 6,829,587, Control No. 95/001,068.

Request for Rexamination of U.S. Patent No. 7,249,059, Control No. 95/001,069.

Request for Rexamination of U.S. Patent No. 7,240,025, Control No. 95/001,073.

"Positives of the Negative: Using negative keywords to enhance your campaign's performance | PPC Hero (R)" dated Mar. 30, 2007. Downloaded from http://www.ppchero.com/positives-of-the-negative-keywords-to-enhance-your-campaign's-performance/ on Mar. 28, 2012, 3 pages.

Notice of Allowance issued in U.S. Appl. No. 13/493,507 on Dec. 20, 2012, 11 pages.

Corrected Notice of Allowance issued in U.S. Appl. No. 13/493,507 on Jan. 28, 2013, 12 pages.

Notice of Allowance issued in U.S. Appl. No. 13/493,507 on Apr. 26, 2013, 22 pages.

Office Action issued in U.S. Appl. No. 11/736,452 on Apr. 16, 2009, 27 pages.

Office Action issued in U.S. Appl. No. 11/736,452 on Nov. 17, 2009, 27 pages.

Office Action issued in U.S. Appl. No. 11/736,452 on Aug. 12, 2010, 16 pages.

Office Action issued in U.S. Appl. No. 11/736,452 on Apr. 1, 2011, 9 pages.

Notice of Allowance issued in U.S. Appl. No. 11/736,452 on Aug. 22, 2011, 8 pages.

Notice of Allowance issued in U.S. Appl. No. 11/736,452 on Apr. 9, 2012, 10 pages.

Office Action issued in U.S. Appl. No. 11/736,448 on Apr. 15, 2009, 22 pages.

Office Action issued in U.S. Appl. No. 11/736,448 on Nov. 17, 2009, 27 pages.

Office Action issued in U.S. Appl. No. 11/736,448 on Aug. 3, 2010, 28 pages.

Office Action issued in U.S. Appl. No. 11/736,448 on Nov. 17, 2010, 25 pages.

Notice of Allowance issued in U.S. Appl. No. 11/736,448 on May 27, 2011, 6 pages.

Notice of Allowance issued in U.S. Appl. No. 11/736,448 on Aug. 31, 2011, 11 pages.

* cited by examiner

DETERMINING PROXIMITY TO TOPICS OF ADVERTISEMENTS

CROSS-REFERENCE

This application is a continuation application of co-pending U.S. application Ser. No. 11/736,448, titled "Determining Proximity to Topics of Advertisements," filed Apr. 17, 2007, the disclosure of which is incorporated herein by reference in its entirety.

BACKGROUND

Content delivery over the internet continues to improve every day. Computer users can receive e-mail, news, games, entertainment, music, books, and web pages—all with a simple Internet connection (and with improved quality on a broadband connection). Internet users also have access to a plethora of services such as maps, shopping links, images, blogs, local search, satellite images, group discussions, hosted content, and e-mail. These service providers can track users' interactions with such services to determine associated metrics and/or modify these services based on such interactions to further enhance the user experience.

When an Internet user accesses these respective services, the content provided by the service is typically related to a particular topic that can, for example, be divided up into various content categories. By determining the category of content provided to an internet user on a particular service, a service provider can give the Internet user additional content and/or advertisements focused on the category desired by the user, thus improving the user's experience.

For example, on the Internet some content providers include search functionality that is based on keywords entered by the user seeking information. This user query can be an indicator of the type of information of interest to the user. By comparing the user query to a list of keywords specified by an advertiser, it is possible to provide targeted ads to the user. An example of such a system is AdWords™ offered by Google, Inc. (Mountain View, Calif.). An example of such a system is described in part in U.S. Pat. No. 6,816,857, entitled "Meaning-based advertising and document relevance determination," issued Nov. 9, 2004, currently assigned to the assignee of the present application and which is hereby incorporated by reference in its entirety.

Alternatively, a content provider can serve advertisements to a user based on a determination of an advertisement most closely related to Internet content such as a web page. This can be done, for example, by associating the content of the web page to a set of one or more advertising keywords closely related to the page content, and serving targeted ads to a user of that web page. An example of such as a system is the AdSense™ system offered by Google, Inc. (Mountain View, Calif.). An example of such a system is in part described in U.S. Pat. No. 7,136,875, entitled "Serving advertisements based on content," issued Nov. 14, 2006 to the assignee of the present application and which is hereby incorporated by reference in its entirety.

Further improvement in the targeting of advertisements to content are possible, especially when keywords are broad and can relate to multiple possible topics of interest to a user and an advertiser.

SUMMARY

The present disclosure includes a system and method for determining proximity to topics of content items (e.g., an advertisement or "ad"). In some implementations, a method includes identifying match criteria associated with keywords of a content item. The keywords used in determining whether or not to embed the content item in Web pages including content such as, for example, search query terms. Numerical scores for the match criteria is determined based, at least in part, on a topic of the content item, the numerical score indicative of proximity to the topic of the content item.

In one embodiment, the method includes preliminarily selecting an advertisement based on a set of search keywords associated with a search query, determining a set of ad keywords associated with the advertisement; mapping the ad keywords to at least one keyword cluster; computing a first conditional probability of the ad keywords in the presence of the at least one keyword cluster; computing a second conditional probability of the search keywords in the presence of the at least one keyword cluster; and, comparing the first conditional probability and the second conditional probability to determine a topical proximity between the search query and the advertisement. In some embodiments, the method further includes identifying a threshold associated with the at least one of the search keywords and the ad keywords; and determining a subset of the search keywords are substantially relevant to the ad keywords based, at least in part, on comparing the difference between the first conditional probability and the second conditional probability, to the threshold.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
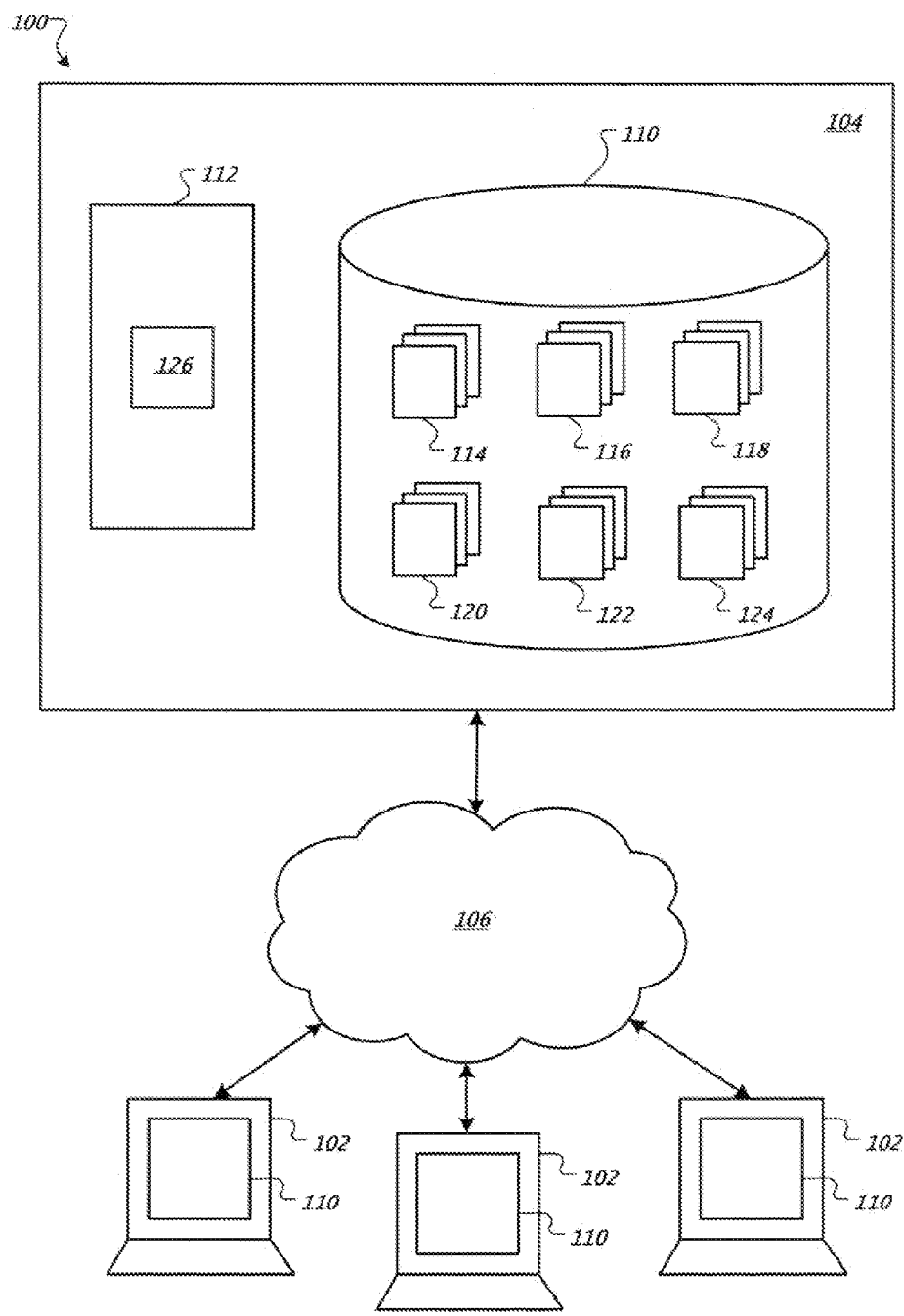
FIG. 1 is a block diagram illustrating an example system for determining topicalities of search criteria in accordance with some implementations of the present disclosure.

FIG. 1 is a block diagram illustrating an example system 100 for determining topicalities of search criteria associated with content items (e.g., advertisements or "ads"). For example, the system 100 may determine a metric (e.g., a numerical score) indicating proximity of one or more character strings (e.g., search criteria) to a topic associated with a content item (e.g., on-line ad). By way of example, systems and methods disclosed herein are discussed with reference to topicalities of search criteria associated with on-line advertisements. The systems and methods disclosed can be used in alternative delivery channels (e.g., not on-line, such as radio) and include other content (e.g., not ads). In some implementations, the proximity metric is based, at least in part, on the conditional probability of one or more character strings appearing in a document given a topic. Frequently, advertisements presented with search results are associated with keywords such that the inclusion of one or more keywords in the match criteria results or otherwise increases a likelihood that the advertisement is presented with content such as, for example, search results. Though, the match criteria (such as, in the case of search results, search criteria), while including some keywords, may in fact not be associated with the same topic as the ad. The system 100, in some implementations, can thus be used with an advertising service to enhance, maximize, or otherwise increase the relevancy of ads presented with search results. In doing so, the system 100 can increase actions rates (e.g., click-through rates) and/or conversions performed in response to presenting the ad.

In some implementations, the system 100 performs one or more of the following: identifying keywords associated with advertisements, mapping keywords to one or more sets of clusters, associating sets of clusters to topics, determining proximity of search criteria to topics based, at least in part, on sets of clusters, and/or assigning a numerical score to search criteria indicating extent of relevance (or irrelevance as the case may be) to topics. In determining the relevancy of search criteria, the system 100 can determine the relevancy of search criteria to a topic using any suitable expression such as a Bayesian network.

Turning to a high level description of the example implementation, the system 100 includes clients 102a-c coupled to evaluation server 104 through a network 106. In this implementation, the client 102 includes a Graphical User Interface (GUI) 110 for displaying information associated with identifying proximity of search criteria to topics by the evaluation server 104. The evaluation server 104 includes a memory 110 and a processor 112. The memory 110 locally stores keyword files 114 for identifying terms associated with advertisements, models 116 for mapping keywords to clusters, cluster files 118 for identifying clusters associated with topics, query files 120 for identifying search criteria that can lead to impressions of the advertisements, evaluation criteria 122 (typically from user input) for identifying criteria to determine metrics indicative of proximity to topics, and evaluation reports 124 for identifying proximity metrics for search criteria based, at least in part, on the evaluation. The processor 112 includes the mapping engine 126 for mapping keywords for advertisements to clusters and the evaluation engine 128 for determining proximity metrics for search criteria using clusters 118. Turning to a high level description of the operation of the system 100, the mapping engine 126, in response to an event (e.g., request, expiration of a period time), maps keywords associated with ads to clusters based, at least in part, on keyword files 114 and models 116. The evaluation engine 126 determines proximity metrics for search criteria based, at least in part, on cluster files 118 and user-input based evaluation criteria 122.

As for a description of the illustrated elements, a client 102 can include or execute at least a GUI 108 and comprises an electronic device (e.g., computing device) operable to receive, transmit, process and store any appropriate data associated with system 100. It will be understood that there can be any number of clients 102 communicably coupled to the evaluation server 104. Further, "client 102" and "user" can be used interchangeably as appropriate without departing from the scope of this disclosure. Moreover, for ease of illustration, each client 102 is described in terms of being used by one user. Alternatively, many users can use one computer or one user can use multiple computers.

As used in this disclosure, the client 102 is any person, department, organization, small business, enterprise, or any other entity that may use or request others to use the system 100. The client 102 is intended to encompass a personal computer, touch screen terminal, workstation, network computer, kiosk, wireless data port, smart phone, personal data assistant (PDA), cellular device, one or more processors within these or other devices, or any other suitable electronic device used by a user viewing Web pages 112 from the evaluation server 104. For example, the client 102 may be a PDA operable to wirelessly connect with an external or unsecured network. In another example, the client 102 may comprise a laptop that includes an input device, such as a keypad, touch screen, mouse, or other device that can accept information, and an output device that conveys information from the evaluation server 104 (e.g., advertisements, search results), including digital data, visual information, or the GUI 110. Both the input device and output device may include fixed or removable storage media such as a magnetic computer disk, CD-ROM, or other suitable media to both receive input from and provide output to users of the client 102 through the display, namely the client portion of the GUI 110.

The GUI 110 comprises a graphical user interface operable to allow the user of the client 102 to interface with at least a portion of the system 100 for any suitable purpose. Generally, the GUI 110 provides the particular user with an efficient and user-friendly presentation of data provided by or communicated within the system 100. The GUI 110 may comprise a plurality of customizable frames or views having interactive fields, pull-down lists, and/or buttons operated by the user. For example, the GUI 110 is operable to search criteria identified as being irrelevant based, at least in part, on a determined metric indicating proximity to a topic associated with an advertisement. The term graphical user interface may be used in the singular or in the plural to describe one or more graphical user interfaces and each of the displays of a particular graphical user interface. The GUI 110 contemplates any graphical user interface, such as a generic web browser or touch screen, that processes information in the system 100 and presents the results to the user. The server 104 can accept data from the client 102 using, for example, the web browser (e.g., Microsoft Internet Explorer or Mozilla Firefox) and return the appropriate responses (e.g., HTML or XML) to the browser using the network 106.

The evaluation server 104 includes a memory 110 and a processor 112. The memory 110 can be a local memory and include any memory or database module and can take the form of volatile or non-volatile memory including, without limitation, magnetic media, optical media, random access memory (RAM), read-only memory (ROM), removable media, or any other suitable local or remote memory component. In the illustrated implementation, the memory 110 locally stores keyword files 114, models 116, cluster files 118, search files 120, typically user-input based evaluation criteria 122, and evaluation reports 124. Local memory 110 can also include any other appropriate data, such as VPN applications or services, firewall policies, a security or access log, print or other reporting files, HTML files or templates, data classes or object interfaces, software applications or sub-systems, and others.

The keyword files 114 can include any parameters, variables, algorithms, instructions, rules, objects, or other directives for associating terms, phrases and/or other character strings with one or more advertisements. In doing so, the keyword files 114 indicate that the associated network ad can be available to present with, for example, search results including, for example, one or more keywords. Often, an advertiser provides terms and/or phrases related to the goods or services associated with the advertisement. In doing so, search criteria including or otherwise associated with the keywords can lead to an impression of the associated advertisement with the search results. In some implementations, the keyword files 114 can be associated with a single advertisement, multiple advertisements, and/or a topic associated with a good and/or service. In some implementations, multiple advertisements can be associated with a single keyword file 114. In certain implementations, the keyword files 114 can be formatted, stored, or defined as various data structures in text files, eXtensible Markup Language (XML) documents, Virtual Storage Access Method (VSAM) files, flat files, Btrieve files, comma-separated-value (CSV) files, internal variables, or one or more libraries. In short, keyword files 114 can comprise one table or file or a plurality of tables or files stored on one computer or across a plurality of computers in any appropriate format. Indeed, some or all of keyword file 114 can be local or remote without departing from the scope of this disclosure and store any type of appropriate data.

The models 116 include can include any parameters, variables, algorithms, instructions, rules, objects, or other directives mapping keywords to other indicative, similar, analogous, or otherwise related terms, phrases, and/or character strings. For example, a model 116 can include information mapping baseball to a cluster, i.e., a group of related terms, that include mitt, bat, hit, run, double, and others. In some implementations, the models 116 merely define or otherwise identify a set of related terms. In this case, a model 116 can be intended to describe a topic and/or semantic concept (e.g., words related to baseball). In addition to terms, the models 116 can include compound words, phrases, and other elements (e.g., a technical paper, a website). In some implementations, the models 116 can be associated with a single topic or multiple topics. In some implementations, multiple topics can be associated with a single model 116. In certain implementations, the models 116 can be formatted, stored, or defined as various data structures in text files, XML documents, VSAM files, flat files, Btrieve files, CSV files, internal variables, or one or more libraries. In short, the models 116 can comprise one table or file or a plurality of tables or files stored on one computer or across a plurality of computers in any appropriate format. Indeed, some or all of models 116 can be local or remote without departing from the scope of this disclosure and store any type of appropriate data.

Cluster files 118 can include one or more data structures and/or entries identifying clusters associated with topics of advertisements. For example, the cluster files 118 may include sets of clusters (e.g., words) associated with the topic of baseball. In this case, a first set of clusters may include mitt, glove, but, and cap, while a second set may include hotdog, cracker jacks, peanuts, and beer. In doing so, the cluster files 118 can be used to determine how proximate search criteria is to the topic of an advertisement. Stated differently, the cluster files 118 can be used to determine how irrelevant search criteria is to topics. In some implementations, the cluster files 118 may be associated with a single keyword file 114, multiple keyword files 114, and/or a topic associated with a good and/or service. In some implementations, multiple topics can be associated with a single keyword file 114 or cluster file 118. In certain implementations, the cluster files 118 can be formatted, stored, or defined as various data structures in text files, XML documents, VSAM files, flat files, Btrieve files, CSV files, internal variables, or one or more libraries. In short, the cluster files 118 can comprise one table or file or a plurality of tables or files stored on one computer or across a plurality of computers in any appropriate format. Indeed, some or all of cluster files 118 can be local or remote without departing from the scope of this disclosure and store any type of appropriate data. One example of a system that provides cluster relationships between keywords is provided in, for example, U.S. patent application Ser. No. 10/676,571, filed Sep. 30, 2003, entitled "Method and Apparatus for Characterizing Documents Based on Clustering of Related Words," assigned to the assignee of the present application and hereby incorporated by reference in its entirety.

The query files 120 includes entries and/or one or more data structures identifying search criteria associated with keyword files 114. For example, the query files 120 can include search criteria that map to or are otherwise associated with keywords of an advertisement. In some implementations, the query files 120 include search criteria matching one or more keywords associated with an advertisement. In some implementations, the query files 120 can include terms and/or phrase indicative, similar, analogous, related, or otherwise associated with one or more keyword files 114. Processes for identifying such queries are discussed in more detail with respect to FIGS. 2 and 3. In some implementations, multiple query files 120 can be associated with a single advertisement, multiple advertisements, and/or a topic associated with a good and/or service. In some implementations, multiple advertisements can be associated with a single query file 120. In certain implementations, the query files 120 can be formatted, stored, or defined as various data structures in text files, XML documents, VSAM files, flat files, Btrieve files, CSV files, internal variables, or one or more libraries. In short, the query files 120 can comprise one table or file or a plurality of tables or files stored on one computer or across a plurality of computers in any appropriate format. Indeed, some or all of query files 120 can be local or remote without departing from the scope of this disclosure and store any type of appropriate data.

Evaluation criteria 122 include any parameters, variables, algorithms, instructions, rules, objects or other directives for evaluating search criteria for proximity to topics associated with advertisements, and is typically based on a user input. For example, the evaluation criteria based on user input 122 can be used to identify directives for determining a score associated with search criteria indicating relevance of the search terms to a topic of an advertisement. In some implementations, the evaluation criteria 122 can include mathematical and/or logical expressions for determining a relevance score associated with a user inputted search query or search criteria. For example, the evaluation criteria 122 can include a mathematical expression for determining a conditional probability associated with search criteria. In this case, the expression can determine the probability that search criteria occurs within one or more clusters associated with a topic of an advertisement. In the case that the model 116 maps keywords to a set of clusters, the evaluation criteria can include an expression to determine the probability that a term in a search criteria occurs in the set of clusters. In the case that C denotes the set of clusters, the conditional probability of search criteria can be expressed as P(word|C). In some implementations, P(word|C) corresponds to P(word|on-topic), which can represent the probability that the term is associated with the topic. Based, at least in part, on P(word|C), the following expression can be used as a scoring method for a set of K words in search criteria:

$$\text{Score}(K \mid C) = \frac{1}{|K|} \sum_{k} \log\left(\frac{P(K_n \mid C)}{1 - P(K_n \mid C)}\right)$$

In some implementations, this expression substantially determines an average logarithmic probability that a word occurs in a set of clusters associated with a topic of an advertisement.

In this example, P(word|C) increases for words that occur with greater frequency in the associated clusters, and accordingly, Score(K|C) also increases. In some implementations, the computed score can be compared with the probability that the keywords associated with an advertisement occurs in the set of clusters, which can be expressed as P(Keywords Associated with an Ad|C). In one example, the relevance can be determined by the difference as expressed in the following equation:

$$\text{Relevance}(Q|C) = \text{Score}(Q|C) - \text{Score}(\text{Keywords Associated with an } Ad|C)$$

In this example, the relevance of search criteria is determined by the difference in the logarithmic odds between search criteria and keywords of an advertisement. In addition, the evaluation criteria 122 can include logical expressions for comparing determined metrics (e.g., relevance) to one or more parameters. For example, the evaluation criteria 122 can identify a proximity threshold such that a metric below this value indicates that the search criteria is not relevant to or otherwise associated with the topic of an advertisement. Also, the evaluation criteria 122 can include a value such that a relevance score above this value indicates that the search query is associated with the topic of the advertisement. The above expressions are examples for determining the relevance of search criteria to a topic associated with an advertisement. Accordingly, other similar mathematical and/or logical expressions can be used to determine relevancy without departing from the scope of this disclosure. In some implementations, the evaluation criteria 122 can be formatted, stored, or defined as various data structures in text files, XML documents, VSAM files, flat files, Btrieve files, CSV files, internal variables, or one or more libraries. In short, the evaluation criteria 122 can be stored to comprise one table or file or a plurality of tables or files stored on one computer or across a plurality of computers in any appropriate format. Moreover, evaluation criteria 122 can be local or remote without departing from the scope of this disclosure and store any type of appropriate data.

The evaluation reports 124 can include entries and/or one or more data structures identifying metrics associated with evaluated search criteria. For example, the evaluation reports 124 may identify relevance scores for search criteria and an indication whether the criteria is proximate a topic of an advertisement. For example, the evaluation reports 124 can identify the search criteria for "Windows operating system" as substantially irrelevant to a "window cleaning service." In some implementations, the evaluation reports 124 can include terms and/or phrases that are substantially irrelevant to a topic of an advertisement. In some implementations, the evaluation reports 124 can be associated with a single advertisement, multiple advertisements, and/or a topic associated with a good and/or service. In some implementations, multiple advertisements can be associated with a single evaluation report 124. In certain implementations, the evaluation reports 124 can be formatted, stored, or defined as various data structures in text files, XML documents, VSAM files, flat files, Btrieve files, CSV files, internal variables, or one or more libraries. In short, the evaluation reports 124 can comprise one table or file or a plurality of tables or files stored on one computer or across a plurality of computers in any appropriate format. Indeed, some or all of evaluation reports 124 can be local or remote without departing from the scope of this disclosure and store any type of appropriate data.

The processor 112 executes instructions and manipulates data to perform operations of the server 104. Although FIG. 1 illustrates a single processor 112 in server 104, multiple processors can be used according to particular needs, and reference to processor 112 is meant to include multiple processors 112 where applicable. In the illustrated implementation, processor 112 executes mapping engine 126 and evaluation engine 128 at any appropriate time such as, for example, in response to a request or input from a user of server 104 or any appropriate computer system coupled with network 106. Mapping engine 126 can include any software, hardware and/or firmware, or combination thereof, operable to map keywords associated with ads to one or more clusters. In some implementations, the mapping engine 126 identifies one or more keywords using keyword files 114 associated with an ad and maps the identified keywords to a set of clusters using models 120. Based, at least in part, on the set of clusters, the mapping engine 126 updates and/or generates one or more cluster files 118.

Evaluation engine 128 can include any software, hardware, and/or firmware, or combination thereof, operable to determine metrics for search criteria indicating proximity to topics. In some implementations, the evaluation engine 128 identifies search criteria that can lead to an impression of an ad using the search files 120 and determine numerical scores for the search criteria indicating proximity to the topic of the ad. As mentioned above, the evaluation engine 128 may also identify substantially irrelevant search criteria based, at least in part, on the numerical score. For example, the evaluation engine 128 may determined whether the numerical scores violate a proximity threshold indicating the search criteria is substantially irrelevant.

Regardless of the particular implementation, "software" can include software, firmware, wired or programmed hardware, or any combination thereof as appropriate. Indeed, mapping engine 126 or evaluation engine 128 can be written or described in any appropriate computer language including C, C++, Java, Visual Basic, assembler, Perl, PHP, as well as others. It will be understood that while the mapping engine 126 and evaluation engine 128 are illustrated in FIG. 1 as including individual modules, the mapping engine 126 and evaluation engine 128 can include numerous other sub-modules, or can instead be a single multi-tasked module that implements the various features and functionality through various objects, methods, or other processes. Further, while illustrated as internal to the server 104, one or more processes associated with the mapping engine 126 and evaluation engine 128 can be stored, referenced, or executed remotely. Moreover, the mapping engine 126 and evaluation engine 128 can be a child or sub-module of another software module or enterprise application (not illustrated) without departing from the scope of this disclosure.

The network 106 facilitates wireless or wireline communication between the evaluation server 104 and any other local or remote computer, such as the client 102. The network 106 can be all or a portion of an enterprise or secured network. While illustrated as single network, the network 106 can be a continuous network logically divided into various sub-nets or virtual networks without departing from the scope of this disclosure, so long as at least portion of the network 106 can facilitate communications of the ads 116 between the evaluation server 104 and the client 102. In some implementations, the network 106 encompasses any internal or external network, networks, sub-network, or combination thereof operable to facilitate communications between various components in the system 100. The network 106 can communicate, for example, Internet Protocol (IP) packets, Frame Relay frames, Asynchronous Transfer Mode (ATM) cells, voice, video, data, and other suitable information between network addresses. The network 106 can include one or more local area networks (LANs), radio access networks (RANs), metropolitan area networks (MANs), wide area networks (WANs), all or a portion of the global computer network known as the Internet, and/or any other communication system or systems at one or more locations.

As an example, an ad for a window cleaning service can advertise using the following keyword phrases: window washer, window cleaner, or tall building window washer. The system 100 can identify, using these initial keywords, a list of queries which can result in the window cleaning service advertisement being presented. For example, the query phrases window washer, window cleaner, window registry cleaner or window washer service can lead to ad impressions when displaying search results. In connection with identifying associated search criteria, the system 100 can map the keywords to sets of clusters representing one or more topics of an ad. For example, the system 100 may map the keywords to the following clusters: (1) window, washer, cleaner, service; and (2) glass, wash, clean, structure, building. Using these clusters, the system 100 may score search queries based on proximity to a topic of the ad. For example, the query phrases window washer, window cleaner, or window washer service can be scored high as a result of the first example cluster, whereas the query phrase window registry cleaner is scored low because registry does not appear in either group.

Figure 2:
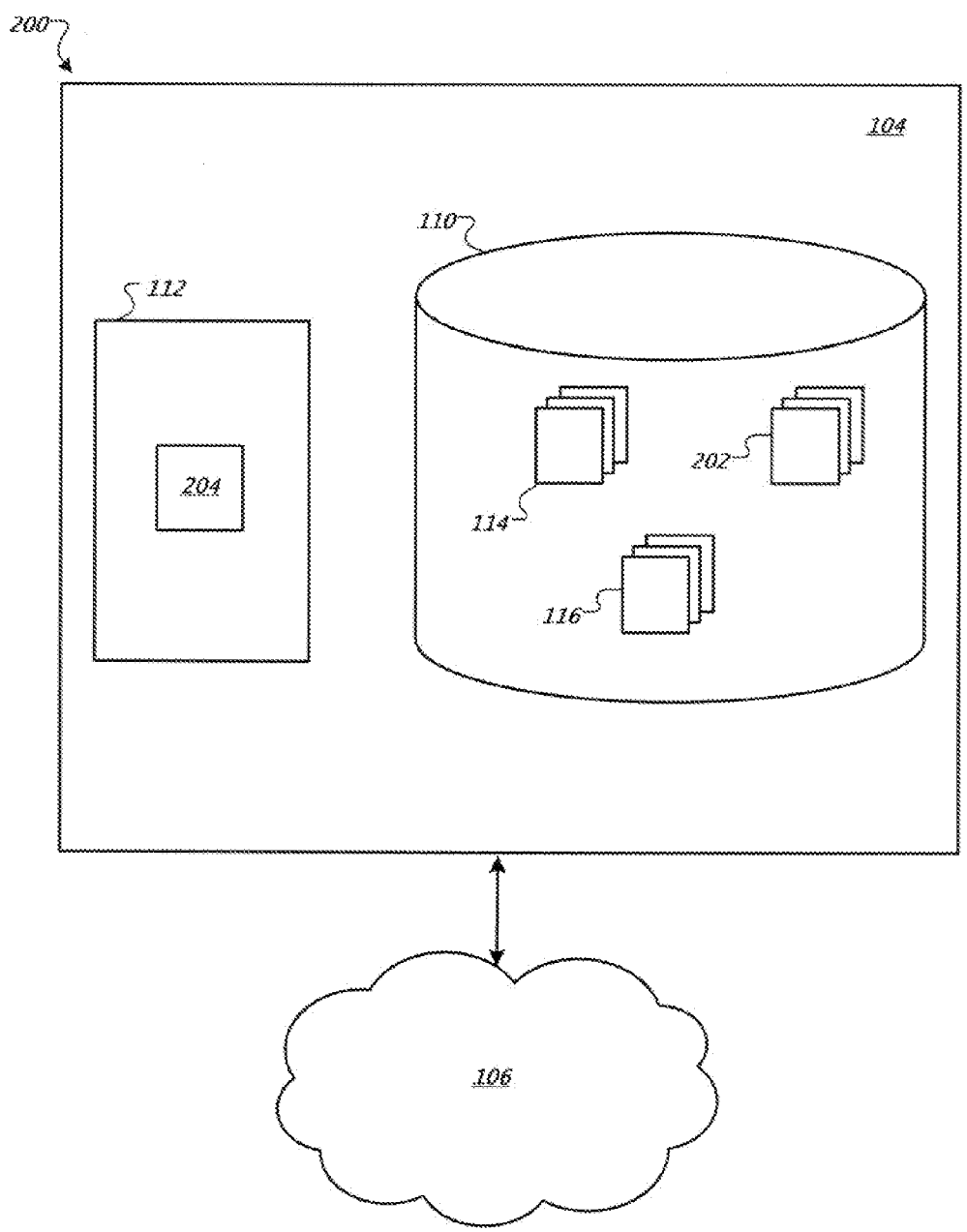
FIG. 2 is a block diagram illustrating an example system for identifying associated search criteria in accordance with some implementations of the present disclosure.
Figure 3:
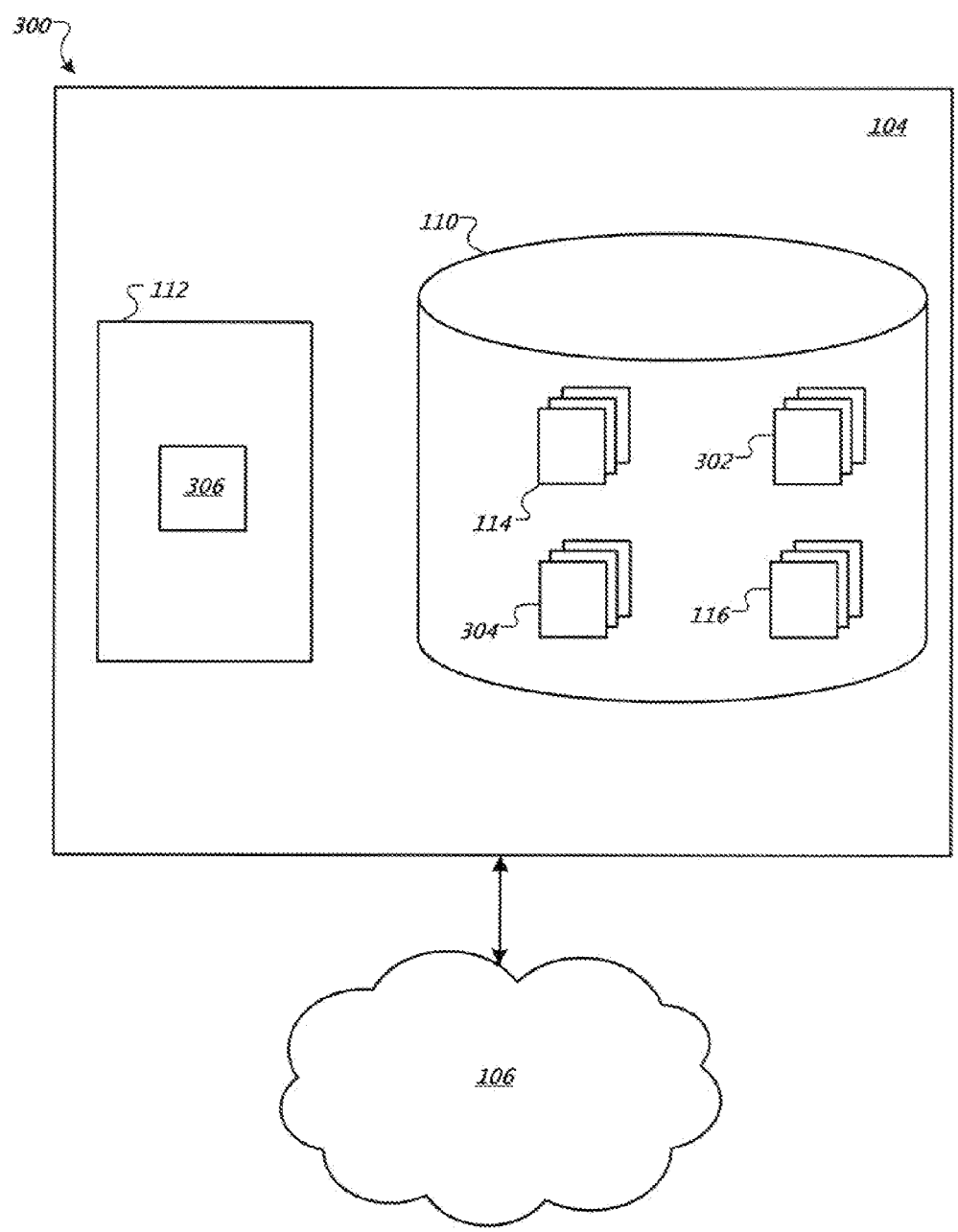
FIG. 3 is a block diagram illustrating another example system for identifying associated search criteria in accordance with some implementations of the present disclosure.

FIGS. 2 and 3 illustrate an example system 200 and 300, respectively, for automatically identifying queries associated with keywords of an advertisement. In the illustrated examples, the system 200 identifies queries actually resulting in impressions of the advertisement, and the system 300 identifies associated queries independent of such historical data. While illustrated as separate systems, the features and functions of the illustrated systems 200 and 300 can be combined without departing from the scope of this disclosure.

Referring to FIG. 2, the system 200 can use prior search criteria to identify a subset of queries resulting in the impression an advertisement. In combination with some of the elements in FIG. 1, the memory 110 includes search log files 202 for identifying previous searches and the processor 112 includes a query engine 204 for identifying associated queries using the search log files 202. The search log files 202 include one or more data structures or entries that identify or include prior search criteria and associated ad impressions. For example, the search log file 202 can include or identify search criteria and ads displayed with the associated search results. In some implementations, the search log files 202 can be formatted, stored, or defined as various data structures in text files, XML documents, VSAM files, flat files, Btrieve files, CSV files, internal variables, or one or more libraries. In short, the log files 202 can comprise one table or file or a plurality of tables or files stored on one computer or across a plurality of computers in any appropriate format. Moreover, the log files 202 can be local or remote without departing from the scope of this disclosure and store any type of appropriate data.

The query engine 204 can include any software, hardware, and/or firmware operable to identify search criteria resulting in ad impressions. For example, the query engine 204 may identify search criteria in the log files 202 that can result in the impression of an advertisement. In some implementations, the query engine 204 identifies search criteria that includes one or more keywords of the advertisement. Alternatively or in combination, the query engine 204 identifies search criteria related to the one or more keywords of the advertisement. For example, the search criteria may include terms that are similar, analogous, related to the same topic, or otherwise associated with one or more keywords of the advertisement. The query engine 204 may limit the evaluation of search criteria to a certain period of time (e.g., 30 days).

In one aspect of operation, the query engine 204 identifies one or more log files 202 associated with a period of time. The query engine 204 identifies those search criteria that resulted in impressions of an advertisement. Based, at least in part, on the identified search criteria, the query engine 204 generates or updates one or more associated query files 120.

Referring to FIG. 3, the system 300 can use prior search criteria to identify those queries that could have lead to an impression of an advertisement. For example, the system 300 may evaluate historical search criteria to identify keywords without relying on search criteria that resulted in an actual impression of an ad. In doing so, the system 300 may not rely on historical data associated with an ad to identify keywords.

In combination with some of the elements in FIG. 1, the memory 110 includes reverse lookup tables 302 and search log files 304. In this implementation, the processor 112 includes a mapping engine 306. The reverse lookup tables 302 can include any parameters, variables, algorithms, instructions, rules, objects or other directives for mapping keywords to other keywords. More specifically, the reverse look-up tables 302 can be used to identify, from a given keyword, other related keywords. Generally, the reverse look-up tables 302 can be used to broaden a given keyword and identify related search criteria even in cases when the search criteria does not include one of the keywords. For example, a given keyword may be associated with (i.e., mapped using the reverse look-up tables) to a set of words related to the same topic. The reverse lookup tables 302 include directives, links, associations or the like for reversing this mapping processes to identify additional keywords. In some implementations, the reverse lookup tables 302 can be formatted, stored, or defined as various data structures in text files. XML, documents, VSAM files, flat files, Btrieve files, CSV files, internal variables, or one or more libraries. In short, the reverse lookup tables 302 can comprise one table or file or a plurality of tables or files stored on one computer or across a plurality of computers in any appropriate format. Moreover, the reverse lookup tables 302 can be local or remote without departing from the scope of this disclosure and store any type of appropriate data.

The search log files 304 include one or more data structures or entries that identify or include prior search criteria and associated ad impressions. For example, the search log file 304 can include or identify search criteria and one or more ads displayed with the associated search results. In some implementations, the search log files 304 can be formatted, stored, or defined as various data structures in text files, XML documents. VSAM files, flat files, Btrieve files, CSV files, internal variables, or one or more libraries. In short, the log files 304 can comprise one table or file or a plurality of tables or files stored on one computer or across a plurality of computers in any appropriate format. Moreover, the log files 304 can be local or remote without departing from the scope of this disclosure and store any type of appropriate data.

The mapping engine 306 can include any software, hardware, and/or firmware operable to identify search criteria associated with keywords. For example, the query engine 204 may identify search criteria in the log files 304 that include one or more of the keywords. In general, the mapping engine 306 performs one or more of the following: identifying previous search criteria including one or more of the keywords and/or mapping keywords located in the previous search criteria to other keywords using the reverse lookup index 302.

In one aspect of operation, the mapping engine 306 identifies one or more keyword files 114 associated with an advertisement. Using terms and/or phrases included in the identified keyword files 114, the mapping engine 306 maps the keywords to other keywords using the reverse lookup index 304. The mapping engine 306 identifies previous search criteria including either the initial and/or mapped keywords. Based, at least in part, on the identified search criteria, the mapping engine 306 generates or updates one or more associated query files 120.

Figure 4:
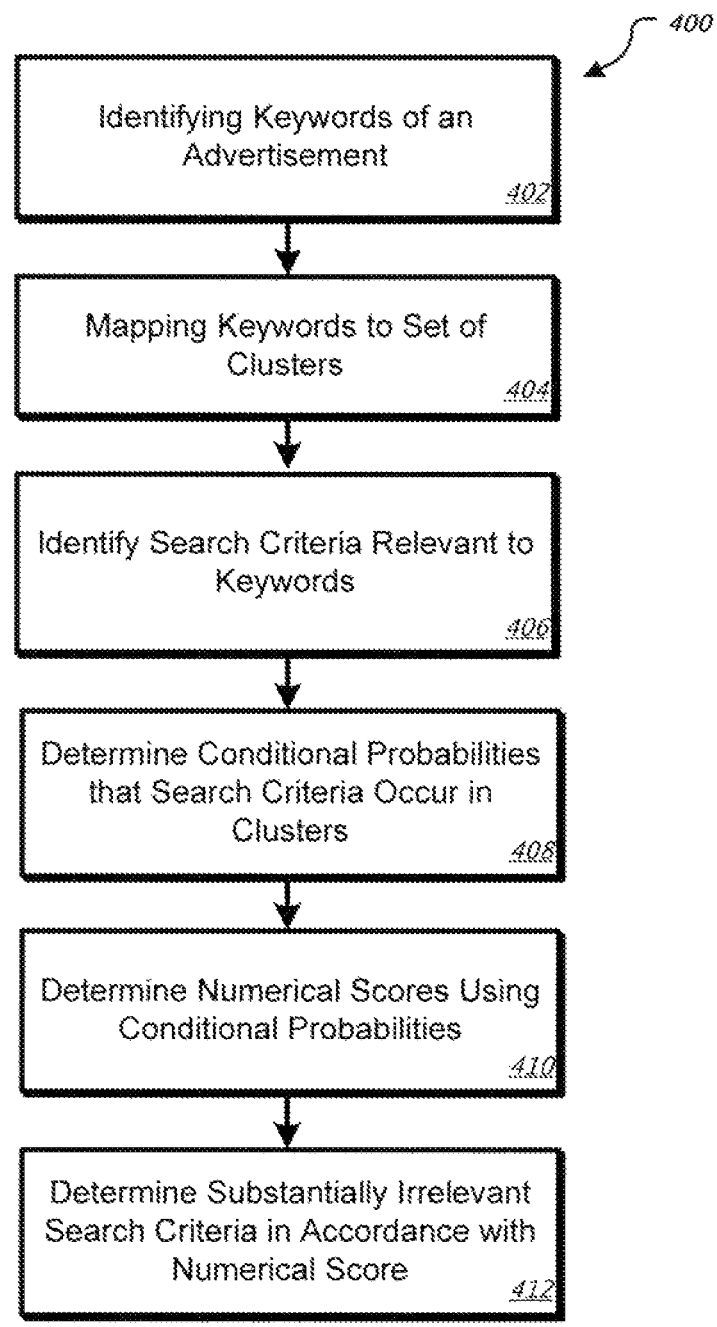
FIG. 4 is a flow diagram illustrating an example method for identifying off topic search criteria in the system of FIG. 1.

FIG. 4 is a flow diagram illustrating an example method 400 for identifying substantially irrelevant search criteria in system 100 of FIG. 1. Generally, method 400 describes an example technique for evaluation engine 128 to determine substantially irrelevant search criteria based on proximity to a topic of an advertisement. The following descriptions will primarily focus on the operation of evaluation engine 128 in performing this method. But system 100 contemplates using any appropriate combination and arrangement of logical elements implementing some or all of the described functionality.

Method 400 begins at step 402 where keywords of an advertisement are identified. At step 404, the identified keywords are mapped to a set of clusters indicative of a topic of the advertisement. Next, at step 406, search criteria relevant to the keywords are identified. For example, search criteria that can lead to an impression of the ad based on the keywords can be identified. In some implementations, the amount of search criteria may be limited, for example, by a period of time (e.g., 30 days). At step 408, conditional probabilities that the search criteria occur in the set of clusters are determined. Using the conditional probabilities, numerical scores indicating proximity to the topic of the ad is determined at step 410. For example, the relevance score may be determined based on the logarithm of the conditional probabilities as described with respect to FIG. 1. Substantially irrelevant search criteria are determined in accordance with the associated numerical score at step 412. In some implementations, the substantially irrelevant search criteria are identified based, at least in part, on a comparison between a threshold and the numerical score.

A number of implementations of the invention have been described. Nevertheless, it will be understood that various modifications can be made without departing from the spirit and scope of the invention. For example, the systems and methods in this disclosure can include inquiring about keywords or negative keywords to a user or another advertiser in the same field rather than determining the keywords and negative keywords. Accordingly, other implementations are within the scope of the following claims.

What is claimed is:

1. A system, comprising:
   one or more data processing apparatuses; and
   a data storage apparatus encoded with instructions that when executed by the one or more data processing apparatuses cause the one or more data processing apparatuses to perform operations comprising:
   accessing ad keyword data specifying an ad keyword associated with an advertisement;
   identifying at least one keyword cluster specifying terms related to a topic of the advertisement;
   determining a first conditional probability that the ad keyword occurs in the at least one keyword cluster;
   identifying one or more search keywords to which the advertisement is responsive;
   determining a second conditional probability that the one or more search keywords occur in the at least one keyword cluster; and
   determining a relevance of the one or more search keywords to the advertisement based at least in part on a comparison of the first conditional probability and the second conditional probability.

2. The system of claim 1, wherein at least one of the first conditional probability or the second conditional probability is determined based at least in part using a Bayesian network.

3. The system of claim 1, wherein determining a relevance comprises:
   determining the relevance of the one or more search keywords to the advertisement based at least in part on a difference between the first conditional probability and the second conditional probability.

4. The system of claim 1, wherein determining a relevance comprises:
   determining a relevance of the one or more search keywords to the topic of the advertisement based at least in part on the comparison of the first conditional probability and the second conditional probability.

5. A computer-implemented method comprising:
   identifying one or more topic terms relevant to a topic of a content item;
   identifying a search query having one or more query terms associated with keywords of the content item;
   determining one or more proximity metrics for the search query based, at least in part, on a comparison of the one or more query terms to the one or more topic terms, wherein the one or more proximity metrics indicate a proximity of the one or more query terms to the topic of the content item; and
   determining that the search query is relevant to the topic of the content item based on a comparison of the one or more proximity metrics to a proximity threshold, the search query being relevant to the topic when the one or more query terms are proximate to the topic.

6. The method of claim 5, wherein determining one or more proximity metrics comprises:
   determining one or more conditional probabilities that the one or more query terms are relevant to the topic of the content item; and
   determining a numerical value indicating the proximity to the topic based, at least in part, on the one or more conditional probabilities.

7. The method of claim 6, wherein the one or more proximity metrics are determined using a Bayesian filter.

8. The method of claim 5, further comprising:
   determining that the search query is irrelevant to the topic of the content item based on a comparison of the one or more proximity metrics to the proximity threshold, the search query being irrelevant to the topic when the one or more query terms are not proximate to the topic.

9. The method of claim 5, wherein the content item is an advertisement.

10. The method of claim 9, wherein the one or more topic terms are terms in a keyword cluster related to the topic of the advertisement.

11. A computer-implemented method comprising:
    accessing ad keyword data specifying ad keywords associated with an advertisement;
    identifying, by one or more processors, a keyword cluster specifying terms related to a topic of the advertisement;
    determining a first conditional probability that the ad keywords occur in the keyword cluster;
    identifying one or more search keywords to which the advertisement is responsive;
    determining a second conditional probability that the one or more search keywords occur in the keyword cluster; and determining a topical proximity between the one or more search keywords and the topic of the advertisement based on a comparison of the first conditional probability and the second conditional probability.

12. The method of claim 11, wherein determining a topical proximity between the one or more search keywords and the topic of the advertisement comprises:
   determining a relevance of the one or more search keywords to the topic based at least in part on a difference between the first conditional probability and the second conditional probability.

13. The method of claim 11, wherein at least one of the first conditional probability or the second conditional probability is determined based at least in part using a Bayesian network.

14. The method of claim 11, further comprising:
   comparing the topical proximity to a proximity threshold; and
   determining that the one or more search keywords are relevant to the topic in response to determining that the topical proximity exceeds the proximity threshold.

15. The method of claim 11, further comprising:
   identifying the advertisement as relevant to the one or more search keywords based on the topical proximity exceeding a proximity threshold.

16. A system, comprising:
   one or more data processing apparatuses; and
   a data storage apparatus encoded with instructions that when executed by the one or more data processing apparatuses cause the one or more data processing apparatuses to perform operations comprising:
      accessing ad keyword data specifying ad keywords associated with an advertisement;
      identifying at least one keyword cluster specifying terms related to a topic of the advertisement;
      determining a first conditional probability that the ad keywords occur in the at least one keyword cluster;
      identifying one or more search keywords to which the advertisement is responsive;
      determining a second conditional probability that the one or more search keywords occur in the at least one keyword cluster; and
      determining a topical proximity between the one or more search keywords and the advertisement based on a comparison of the first conditional probability and the second conditional probability.

17. The system of claim 16, wherein the instructions, when executed by the one or more data processing apparatuses, cause the one or more data processing apparatuses to perform operations further comprising:
   comparing the topical proximity to a proximity threshold; and
   determining that the one or more search keywords are not relevant to the advertisement in response to determining that the topical proximity does not exceed the proximity threshold.

18. The system of claim 16, wherein the instructions, when executed by the one or more data processing apparatuses, cause the one or more data processing apparatuses to perform operations further comprising:
   identifying the advertisement as relevant to the one or more search keywords based on the topical proximity exceeding a proximity threshold.

19. The system of claim 16, wherein at least one of the first conditional probability or the second conditional probability is determined based at least in part using a Bayesian network.

20. Software stored in a computer memory device accessible by one or more data processing apparatuses that upon such execution cause the one or more data processing apparatuses to perform operations comprising:
   accessing ad keyword data specifying ad keywords associated with an advertisement;
   identifying a keyword cluster specifying terms related to a topic of the advertisement;
   determining a first conditional probability that the ad keywords occur in the keyword cluster;
   identifying one or more search keywords to which the advertisement is responsive;
   determining a second conditional probability that the one or more search keywords occur in the keyword cluster; and
   determining a relevance of the one or more search keywords to the topic of the advertisement based at least in part on a comparison of the first conditional probability and the second conditional probability.

* * * * *